Feb. 2, 1960     H. E. KRUSE     2,923,271
UNIVERSAL SEMAPHORE ATTACHMENT FOR MOTOR VEHICLES
Filed April 5, 1957
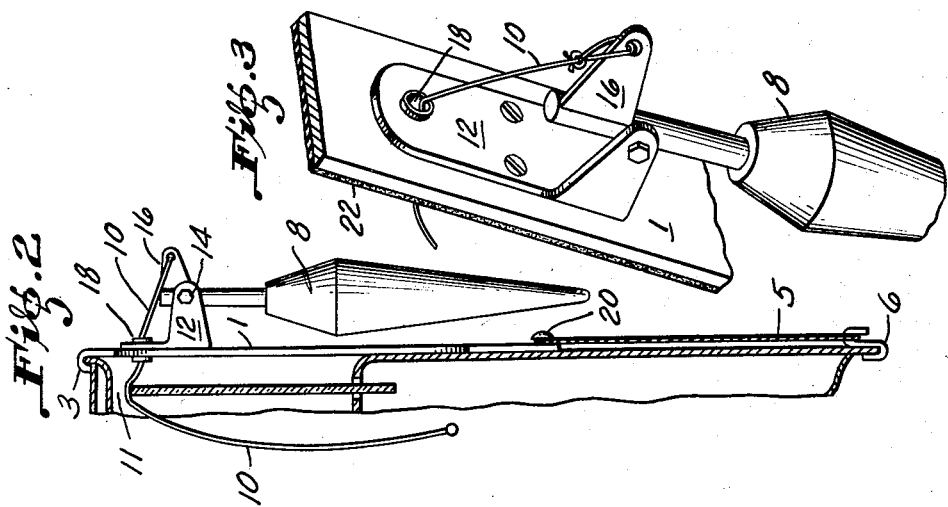
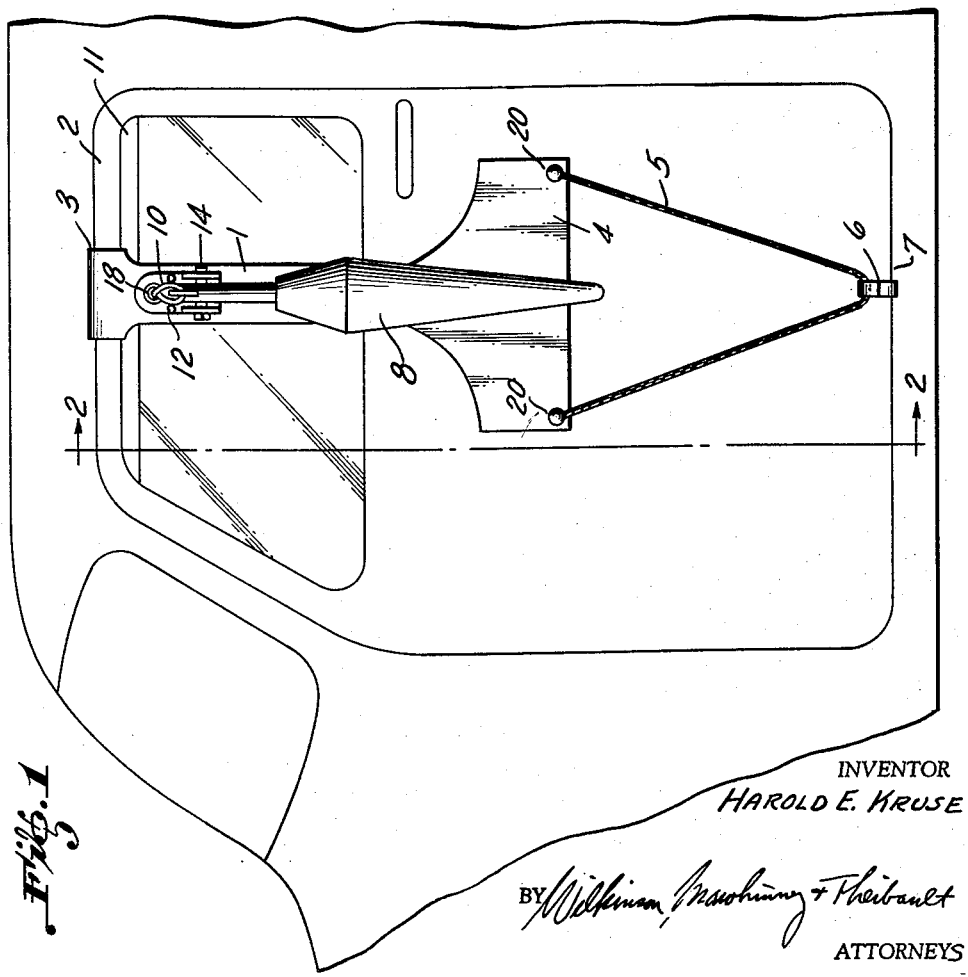
INVENTOR
HAROLD E. KRUSE
BY *(signature)*
ATTORNEYS

United States Patent Office 2,923,271
Patented Feb. 2, 1960

2,923,271

UNIVERSAL SEMAPHORE ATTACHMENT FOR MOTOR VEHICLES

Harold E. Kruse, Roseburg, Oreg.

Application April 5, 1957, Serial No. 651,059

1 Claim. (Cl. 116—52)

The present invention relates to a universal semaphore attachment for motor vehicles and more particularly to a device for holding signals or semaphores to motor vehicles.

In the use of trailers behind vehicles, in many States its is required that a mechanical semaphore, including lights be used to signal direction of intentions to turn or travel.

In the case where a boat is to be trailed, or a trailer temporarily behind an automobile, the owner as a rule does not wish to mar the vehicle with screwed-on brackets and the like; therefore while having to use a semiphore temporarily, this device can be clipped on the door of the vehicle supporting the said semaphore.

It is also desired that the semaphore attachment be readily changed from one vehicle to another when desired.

It is accordingly an object of this invention to provide a portable universal semaphore signalling attachment for a motor vehicle which is readily attachable to and detachable from various vehicles.

It is another object of this invention to provide a universal semaphore attachment for motor vehicles which may be changed from vehicle to vehicle without marring painted finishes, vehicle doors, windows and the like.

It is another object of this invention to provide an improved semaphore attachment for hanging on vehicle doors which will permit the window of the vehicle door to be run up and down.

It is another object of this invention to provide an improved universal semaphore attachment for vehicle doors which will permit the vehicle door to be opened and closed even though the semaphore attachment is secured in place.

It is another object of this invention to provide an improved portable universal semaphore attachment which may be operated from the interior of the vehicle.

It is another object of this invention to provide an improved universal semaphore attachment for a motor vehicle having the necessary stability to support a semaphore arm of considerable length when desired.

It is another object of this invention to provide an improved universal semaphore attachment for motor vehicles that is simple and easy to attach or detach and requires but a short time to do so.

It is another object of this invention to provide an improved universal semaphore attachment for motor vehicles wherein the semaphore arm will not swing against the glass window or other part of the motor vehicle door when the semaphore arm is in a downward position.

With the foregoing and other objects in view, the invention will be more fully described hereinafter, and will be more particularly pointed out in the appended claims.

In the drawings, wherein like symbols refer to like or corresponding parts throughout the several views:

Figure 1 is a front view of an automobile door with the bracket of the present invention secured in place.

Figure 2 is a cross-sectional view of the automobile door taken at points 2—2 in Figure 1, and showing a side view of the subject universal bracket attachment in place.

Figure 3 is a fragmentary perspective view of the bracket showing one form of device for pivotally mounting a signal arm thereto.

Referring to the drawings, and particularly to Figures 1, 2 and 3, a supporting bracket or plate 1 having a top hooked section 3 is shown hung from vehicle door top 2. A conventional semaphore arm 8 is pivotally mounted on bearing lug or block 12 by means of pin bolt 14. An operating cord 10 extends from the interior of the vehicle through window opening 11 and aperture 18 in the supporting bracket and bearing block to lever extension 16 of semaphore arm 8. Block 12 is mounted on bracket 1. Lever extension 16 extends radially and horizontally away from pin bolt 14 in order to supply in the position shown advantage to operating cord 10 in raising semaphore arm 8. Supporting bracket 1 has a relatively wider lower section 4 for resting against the vehicle door to provide lateral support and stability to the semaphore attachment. An adjustable extension cord 5 extends from bosses 20 on supporting bracket 1 to a second hook 6 engaging the lower edge of the vehicle door at 7. Extension cord 5 may have an elastic portion or may simply be drawn up tight to accommodate varying sizes of vehicle doors.

In operation the universal semaphore attachment is secured to a vehicle door by hanging hooked portion 3 over the top of the vehicle door and by drawing extension cord 5 tight around second hook 6. The vehicle door is not marred because supporting bracket 1 is backed with rubber, felt, sponge rubber, or like fabric substance 22. In order to signal for a turn the vehicle driver merely pulls operating cord 10 to raise semaphore arm 8 into a horizontal position. The semaphore arm may be readily observed by anyone from the rear of the vehicle and from the rear of any trailer. The stem or shank 1 of the bracket is narrow so as not to obscure vision where the bracket passes over the window. The wider lower section 4 of the bracket also spaces the holes or bosses 20 a great distance apart whereby the legs of the cord 5 tend to pull hook 6 from opposite directions effecting stability of position of the lower hook.

It can be readily understood from the drawings and description of this invention that this provides a convenient way of mounting signals on fine vehicles without in any way scratching or marring them while making hunting trips or camping tours and the like still conforming to the law of the State.

It will be noted that the support bracket comprises upper and lower sections 1 and 4. The upper section comprises a narrow strip extending substantially vertically and depending from the hook 3 which engages the upper edge of the door. The strip 1 is continued downwardly below the window 11 and the purpose of the narrowness of the strip is so that it will not obscure the vision of the driver and will have minimum interference with the window visibility. The lower section 4 comprises a laterally wide plate joined at its intermediate upper portion with the lower end of the strip 1, the plate 4 engaging the door at laterally remote points for resisting any rocking of the narrow strip 1 on the upper hook. The resilient flexible connection 5 has end portions affixed to the laterally remote points of the plate 4 and legs of this flexible connection 5 converge downwardly, as shown in Figure 1, to an intermediate looped portion engaging about the lower hook and tending to draw the hooks together through the bracket and to consequently clamp the hooks tightly to the door upper and lower edges.

The strip 1 is so formed and located as to support a bracket which outstands from the upper portion of the strip, such bracket supporting the signal member 8 which is pivoted in the bracket on the horizontal axis 14, the arrangement being such that the signal member will normally drop down to the position of Figures 1 and 2 by gravity so that the same is in substantial parallelism with the strip and central portion of the plate. It will be noted that a portion of the signal member extends upwardly beyond the pivot 14 and receives an actuating web outstanding from such portion with an actuating cord connected to the outer end of the web, which cord passes through an aperture in the upper portion of the strip in a favorable position to permit the cord to enter the driver's compartment through the top opening of the window above the window glass.

I do not wish to be limited to the exact mechanical construction as other modifications of structure may be used still coming within the scope of the object of the invention.

What I claim is:

A signal for automobiles for attachment to the driver's door comprising hooks for engaging the upper and lower edges of the door, a support bracket depending from the upper hook and comprising upper and lower sections, said upper section comprising a narrow strip extending from the upper hook down outside the door window with minimum interference with the window visibility and terminating below such window, said lower section comprising a laterally wide plate joined at its intermediate upper portion with the lower end of said strip and engaging the door at laterally remote points for resisting rocking of the narrow strip on the upper hook, a resilient flexible connection having end portions affixed to the laterally remote points of the lower section and having legs converging downwardly with a looped portion engaging about the lower hook tending to draw the hooks together and consequently to clamp the hooks tightly to the door upper and lower edges, a bracket outstanding from the upper outer portion of the strip, a signal member pivoted in said bracket and normally depending therefrom gravitationally in parallelism with the strip and central portion of the plate, a portion of the signal member extending to a distance above its pivot point, an actuating web outstanding from said portion, an actuating cord connected to the outer end of the web, said strip having an aperture in its upper portion to slidably receive therethrough the cord in position to direct the cord above the top edge of the window glass and into the driver's compartment.

References Cited in the file of this patent

UNITED STATES PATENTS

| | | |
|---|---|---|
| 1,873,033 | Reynolds | Aug. 23, 1932 |
| 2,282,663 | Majerus | May 12, 1942 |
| 2,448,077 | Brooks | Aug. 31, 1948 |
| 2,518,538 | Giblin | Aug. 15, 1950 |
| 2,669,212 | Dean | Feb. 16, 1954 |

FOREIGN PATENTS

| | | |
|---|---|---|
| 594,033 | Great Britain | Oct. 31, 1947 |